United States Patent
Kawasaki et al.

(10) Patent No.: US 7,907,288 B2
(45) Date of Patent: Mar. 15, 2011

(54) SHAPE MEASURING APPARATUS

(75) Inventors: Kazuhiko Kawasaki, Tsukuba (JP); Satoshi Koga, Tsukuba (JP); Yoshimasa Suzuki, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 455 days.

(21) Appl. No.: 12/219,285

(22) Filed: Jul. 18, 2008

(65) Prior Publication Data

US 2009/0021747 A1 Jan. 22, 2009

(30) Foreign Application Priority Data

Jul. 19, 2007 (JP) ................... 2007-188070

(51) Int. Cl.
G01B 5/28 (2006.01)
G01B 11/02 (2006.01)

(52) U.S. Cl. .......................... 356/501; 73/105
(58) Field of Classification Search .......... 356/479, 356/497, 501, 505, 508; 73/105
See application file for complete search history.

(56) References Cited

U.S. PATENT DOCUMENTS

| | | | |
|---|---|---|---|
| 5,085,070 A | 2/1992 | Miller et al. | |
| 7,395,698 B2* | 7/2008 | Degertekin | 73/105 |
| 7,441,447 B2* | 10/2008 | Degertekin et al. | 73/105 |
| 7,474,410 B2* | 1/2009 | Moon | 356/501 |
| 7,533,561 B2* | 5/2009 | Beyder et al. | 73/105 |
| 7,545,508 B2* | 6/2009 | Kawakatsu | 356/501 |
| 7,681,439 B2* | 3/2010 | Kawasaki et al. | 73/105 |
| 7,738,115 B2* | 6/2010 | Ocelic et al. | 356/501 |
| 7,797,757 B2* | 9/2010 | Degertekin | 850/7 |
| 2002/0088937 A1 | 7/2002 | Ando et al. | |
| 2007/0103697 A1* | 5/2007 | Degertekin | 356/501 |
| 2007/0234786 A1* | 10/2007 | Moon | 73/105 |
| 2008/0047335 A1* | 2/2008 | Kawasaki et al. | 73/105 |
| 2009/0064771 A1* | 3/2009 | Dick et al. | 73/105 |
| 2009/0064772 A1* | 3/2009 | Wang | 73/105 |

FOREIGN PATENT DOCUMENTS

| | | |
|---|---|---|
| JP | A-7-43144 | 2/1995 |
| JP | A-2002-181687 | 6/2002 |

OTHER PUBLICATIONS

"Optical Atomic Force Sensor," *IBM Technical Disclosure Bulletin*, International Business Machines Corp., 1989, vol. 32, No. 3A, pp. 241-242.

European Search Report issued in European Patent Application No. 08013022.2, dated Jul. 6, 2010.

* cited by examiner

*Primary Examiner* — Gregory J Toatley
*Assistant Examiner* — Scott M Richey
(74) *Attorney, Agent, or Firm* — Oliff & Berridge, PLC

(57) ABSTRACT

A shape measuring apparatus includes a probe for scanning across a surface to be measured, while vibrating up and down; a minute-vibration generation section for vibrating the probe up and down; a vertical movement control section for moving the probe up and down to keep a constant contact force or a constant distance between the surface to be measured and the probe; a scanning section for scanning the surface to be measured with the probe; a displacement sensor for measuring the vertical displacement of the probe and outputting a probe displacement signal; and a signal processing section for obtaining information about the contact force or the distance between the surface to be measured and the probe from a high-frequency component of the probe displacement signal, and for obtaining information about profile of the surface to be measured from a low-frequency component of the signal obtained when the surface to be measured is scanned such that the distance or the contact force is kept constant.

18 Claims, 5 Drawing Sheets

SHAPE MEASURING APPARATUS

RELATED APPLICATIONS

This application claims the priority of Japanese Patent Application No. 2007-188070 filed on Jul. 19, 2007, which are incorporated herein by reference.

BACKGROUND OF THE INVENTION

1. Field of the Invention

The present invention relates to shape measuring apparatuses, and more specifically to improvements in their contact-force detection mechanisms.

2. Prior Art

Shape measuring apparatuses have been used conventionally to measure the shapes of surfaces to be measured by moving a probe across the surface to be measured and observing the amount of up-and-down movement of the probe. For example, an atomic force microscope (disclosed in Japanese Unexamined Patent Application Publication No. 2002-181687) performs scanning measurement, while keeping a contact force or distance between the surface to be measured and the probe constant by means of an atomic force acting therebetween. FIG. 5 shows an example of this. In the figure, a laser L, a cantilever C, a probe P, and a quadrant photodetector D are provided. A surface S to be measured is moved to cause the probe P on the cantilever C to scan across the surface S to be measured. As the probe P moves up and down along the profile of the surface S to be measured, the cantilever C bends, changing the pressing force of the probe P, or the contact force. The change in the contact force changes the distance between the probe P and the surface S to be measured and may also cause the probe P to damage the surface S to be measured. Accordingly, the shape measuring apparatus should control the contact force appropriately. A typical contact-force control method uses an optical lever, which is shown in FIG. 5. The laser L directs laser light onto the back of the probe P, and light reflected there is received by the quadrant photodetector D. As the probe P moves up and down along the profile of the surface S to be measured, the angle of the back of the cantilever C changes relative to the optical axis of the laser light, thus changing the angle of the reflected light. The angular change causes the light intensity signal of the quadrant photodetector D to vary, and the contact force of the cantilever C is detected thereby. By moving the cantilever C or the surface S to be measured up and down in the direction in which the probe P is observing the displacement, the contact force can be kept constant. By measuring the amount of vertical displacement of the cantilever C or the surface S to be measured with a separate displacement sensor, the height information of the surface S to be measured, as indicated by the probe P, can be obtained, and consequently the shape of the surface S can be measured.

The structure of the conventional shape measuring apparatus could be simplified further, but there has not been an appropriate technique for making necessary improvements.

SUMMARY OF THE INVENTION

In view of the problems of the related art, the present invention has been made. An object of the present invention is to provide a shape measuring apparatus having a simplified structure.

The inventors have studied simplification of the structure and have focused their attention on the displacement sensor, among a great number of components of shape measuring apparatuses. The conventional structure uses separate displacement sensors for detecting the contact force of the probe and for obtaining information about the profile of the surface to be measured. The inventors have found that a single displacement sensor can detect both the contact force and the displacement of the probe, by using a high-frequency component of a probe displacement signal output from the displacement sensor to keep a constant contact force or a constant distance between the surface to be measured and the probe and by using a low-frequency component of the probe displacement signal to calculate the shape of the surface to be measured, thus leading to completion of the present invention.

To achieve the foregoing object, a shape measuring apparatus according to the present invention includes a probe, a minute-vibration generation section, a vertical movement control section, a scanning section, a displacement sensor, and a signal processing section.

The probe scans across the surface to be measured, while vibrating up and down.

The minute-vibration generation section vibrates the probe up and down.

The vertical movement control section moves the probe up and down to keep a constant contact force or a constant distance between the surface to be measured and the probe.

The scanning section moves the probe across the surface to be measured.

The displacement sensor measures the vertical displacement of the probe and outputs a probe displacement signal.

The signal processing section obtains information about the contact force or the distance between the surface to be measured and the probe from the high-frequency component, which corresponds to the vibration of the probe, of the probe displacement signal output from the displacement sensor when the probe approaches the surface to be measured, while vibrating up and down. The signal processing section also obtains information about the profile of the surface to be measured from the low-frequency component, which corresponds to the profile of the surface to be measured, of the probe displacement signal output from the displacement sensor when the surface to be measured is scanned such that the distance or the contact force is kept constant.

It is preferred in the present invention that the minute-vibration generation section vibrate the probe at a frequency higher than the sampling frequency at which the shape of the surface to be measured is detected (extracted).

In the present invention, it is preferred that the signal processing section include a signal-splitting section, a vibration-component extraction section, a profile-component extraction section, a vibration-information acquisition section, and a profile-information acquisition section.

The signal-splitting section splits the probe displacement signal output from the displacement sensor.

The vibration-component extraction section extracts the high-frequency component corresponding to the vibration of the probe, from one part of the probe displacement signal split by the signal-splitting section.

The profile-component extraction section extracts the low-frequency component corresponding to the profile of the surface to be measured, from the other part of the probe displacement signal split by the signal-splitting section.

The vibration-information acquisition section acquires the vibration amplitude information of the probe, from the high-frequency component extracted by the vibration-component extraction section.

The profile-information acquisition section acquires the profile information of the surface to be measured, from the low-frequency component extracted by the profile-component extraction section.

It is preferred in the present invention that the vibration-component extraction section include a high-pass filter or a band-bass filter and that the profile-component extraction section include a low-pass filter.

The high-pass filter or band-pass filter passes just the high-frequency component of the probe displacement signal, corresponding to the vibration of the probe.

The low-pass filter passes just the low-frequency component of the probe displacement signal, corresponding to the profile of the surface to be measured.

If a high-pass filter is used in the present invention, the cutoff frequency is preferably set lower than the vibration frequency (usually resonance frequency) of the probe so that the high-pass filter will not affect the vibration component of the probe. It is preferred in the present invention that the cutoff frequency of the high-pass filter be set to about $\frac{1}{5}$ to $\frac{1}{10}$ of the vibration frequency of the probe.

If a band-pass filter is used, the central frequency of the pass band is preferably set close to the vibration frequency of the probe. This makes it possible to exclude a noise component having a frequency higher than the vibration frequency of the probe. Accordingly, the band-pass filter is preferred to the high-pass filter.

The cutoff frequency of the low-pass filter is preferably set lower than the vibration frequency of the probe so that the vibration component of the probe is attenuated sufficiently so as not to cause an error in the detection of the shape component of the surface to be measured. It is particularly preferred in the present invention that the cutoff frequency of the low-pass filter be set to about $\frac{1}{10}$ of the vibration frequency of the probe.

It is preferred in the present invention that the displacement sensor include a reference member held in such a manner that the position and orientation are unchanged with respect to the surface to be measured even during scanning, and that the displacement sensor measure the vertical displacement of a specific part of the probe with reference to the reference member.

It is preferred in the present invention that the displacement sensor be a laser interferometric displacement sensor; that the reference member include a reference mirror of the laser interferometric displacement sensor as a reference plane; and that an interference signal be obtained by causing interference on the reference plane between reflection light from the reference plane, of light incident on the reference plane, and reflection light from the specific part of the probe, of light passing through the reference plane and incident on the specific part of the probe, and the interference signal be output as the probe displacement signal.

It is preferred in the present invention that the displacement sensor be a capacitance displacement sensor; that opposed flat electrodes be disposed on the reference member and the specific part of the probe; and that the probe displacement signal be based on a change in capacitance between the reference member and the specific part of the probe and be output.

It is preferred in the present invention that the probe be disposed at a free end of a flexible cantilever and the probe move up and down in contact with the surface to be measured, in accordance with the profile of the surface to be measured.

The shape measuring apparatus of the present invention has the signal processing section, which obtains the information about the contact force of the probe from the high-frequency component of the probe displacement signal output from the displacement sensor, and which obtains the information about the profile of the surface to be measured from the low-frequency component of the probe displacement signal output when the surface to be measured is scanned with keeping the contact force constant.

Accordingly, the present invention makes it possible to detect both the contact force of the probe and profile of the surface to be measured with a single displacement sensor, and therefore, the structure of the apparatus can be simplified in comparison with the conventional apparatus using separate displacement sensors for detecting the contact force of the probe and the profile of the surface to be measured.

DESCRIPTION OF THE PREFERRED EMBODIMENT

A preferred embodiment of the present invention will be described below with reference to the drawings.

Figure 1:
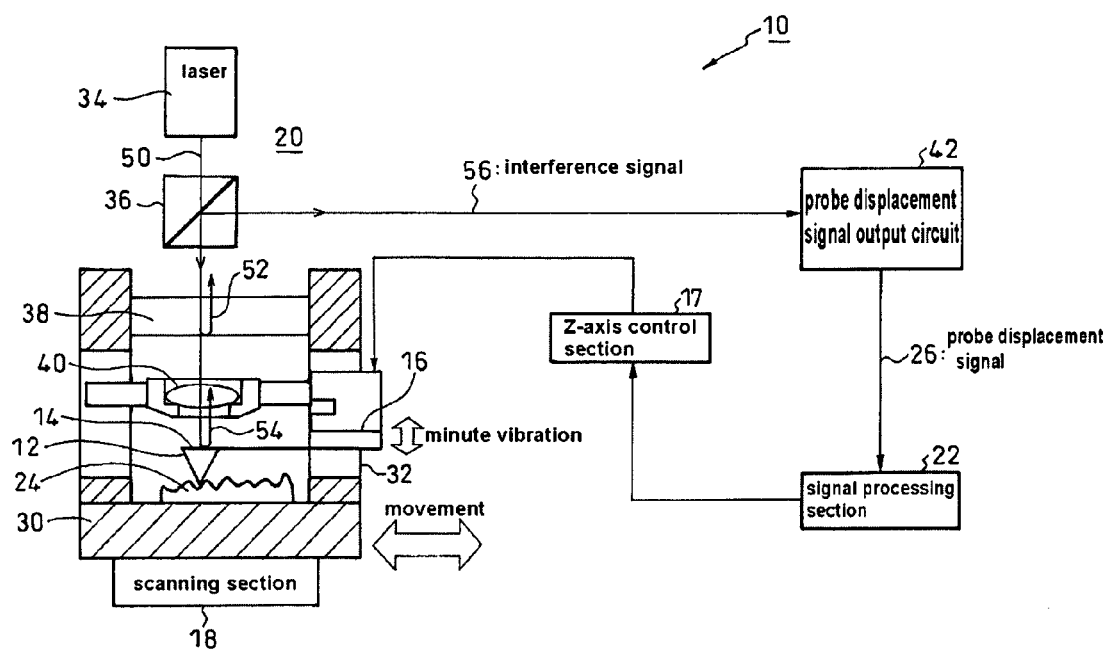
FIG. 1 illustrates an outline structure of a shape measuring apparatus according to an embodiment of the present invention.

FIG. 1 illustrates an outline structure of a shape measuring apparatus 10 according to the present invention.

The shape measuring apparatus 10 shown in the figure includes a probe 12, a flexible cantilever 14, a minute-vibration generation section 16, a Z-axis control section (vertical movement control section) 17, a scanning section 18, a displacement sensor 20, and a signal processing section 22.

The probe 12 is disposed at a free end of the cantilever 14. The probe 12 scans across a surface 24 to be measured, while vibrating minutely up and down. The probe 12 moves up and down in contact with the surface 24 to be measured in accordance with the profile of the surface 24 to be measured.

The minute-vibration generation section 16 holds the cantilever 14 and vibrates the probe 12 minutely up and down at a frequency higher than the sampling frequency at which the shape of the surface 24 is measured.

The Z-axis control section 17 moves the minute-vibration generation section 16 up and down so that the contact force of the probe 12 against the surface 24 to be measured (the amplitude of the oscillation of a high-frequency component described below) is kept constant within a permissible range.

The scanning section 18 moves the probe 12 across the surface 24 to be measured.

The displacement sensor 20 measures the vertical displacement of the probe 12 and outputs a probe displacement signal 26.

The signal processing section 22 obtains information about the contact force or the distance between the surface 24 to be measured and the probe 12 from the high-frequency component, corresponding to the vibration of the probe 12, of the probe displacement signal 26 output from the displacement sensor 20 when the probe 12 is brought closer to the surface 24 to be measured while vibrating vertically.

The signal processing section 22 also obtains information about the profile of the surface 24 to be measured from the low-frequency component, corresponding to the profile of the surface 24 to be measured, of the probe displacement signal 26 output from the displacement sensor 20 when the surface 24 to be measured is scanned in such a manner that the amplitude of the oscillation of the high-frequency component is kept constant within the permissible range.

In this embodiment, the shape measuring apparatus 10 further includes an XY stage 30 and a support 32. The surface 24 to be measured is placed on the XY stage 30. The scanning section 18 scans the surface 24 to be measured with the probe 12 by moving the XY stage 30, which has a reference plane 38 integrally formed thereon, in the XY direction. The minute-vibration generation section 16 and the displacement sensor 20 are disposed on a base, independently of the XY stage 30. When the shape measuring apparatus 10 scans the surface 24 to be measured, it also scans the reference plane 38. Therefore, there is a fixed relative positional relationship between the surface 24 to be measured and the reference plane 38. Measuring the vertical displacement of the probe 12 along the surface 24 to be measured interferometrically involves measuring the shape of the surface 24 to be measured with reference to the reference plane 38 via the probe 12.

In this embodiment, the displacement sensor 20 is of the laser interferometric type.

The laser interferometric displacement sensor 20 includes a laser 34, a beam splitter 36, the reference plane (reference member) 38, a lens 40, and a probe displacement signal output circuit 42.

The reference plane 38 is held in such a manner that the position and orientation are unchanged with respect to the surface 24 to be measured even during scanning. A reference mirror of a laser interferometer is provided as the reference plane 38.

When laser light (coherent light) 50 falls on the reference plane 38, reflection light 52 is obtained on the reference plane 38. When the laser light 50 passes through the reference plane 38 and falls on the back of the probe 12, reflection light 54 is obtained on the back of the probe 12. An interference signal 56 is obtained by interfering the reflection light 52 with the reflection light 54 on the reference plane 38. The laser interferometric displacement sensor 20 obtains the interference signal 56 and outputs it as the probe displacement signal 26.

The shape measuring apparatus 10 of the embodiment is structured in outline as described above, and the operation thereof will be described below.

In the embodiment, the reference plane 38 is held in such a manner that the position and orientation are unchanged with respect to the surface 24 to be measured even during scanning by the probe 12. The displacement sensor 20 measures the vertical displacement of a specific part of the probe 12 with reference to the reference plane 38. Therefore, the apparatus according to the embodiment can accurately measure the information about the height of the surface 24 to be measured.

The laser light 50 from the laser 34 passes through the beam splitter 36 and reaches the reference plane 38. The lens 40 focuses light passing through the reference plane 38 onto the back of the cantilever 14, and the reflection light 54 from the back of the probe 12 passes through the lens 40 again. This reflection light 54 is superimposed on the reference light 52, reflected from the reference plane 38, and reflected by the beam splitter 36 to obtain the interference signal 56. The interference signal 56 obtained by moving the probe 12 across the surface 24 to be measured is analyzed to obtain information about the vertical displacement of the probe 12. Consequently, accurate information about the relative height of the surface 24 to be measured with respect to the reference plane 38 can be obtained through the back of the probe 12.

A general shape measuring apparatus normally uses two displacement sensors to control the contact force of the probe against the surface to be measured, that is, one displacement sensor for detecting the contact force and another displacement sensor for obtaining information about the profile of the surface to be measured.

In contrast, this embodiment uses the extracted high-frequency component and low-frequency component of the probe displacement signal 26 output from the displacement sensor 20. The information about the contact force of the probe is obtained from the high-frequency component, and the information about the profile of the surface to be measured is obtained from the low-frequency component. Therefore, both the contact force and displacement of the probe can be detected with a single displacement sensor.

In the present invention, the probe is brought closer to the surface to be measured, while vibrating minutely at a high frequency. An interference signal obtained thereby is used to obtain the probe displacement signal. From the amplitude of the high-frequency component of the probe displacement signal (or a change in phase of the probe displacement signal and a vibration signal applied to the minute-vibration generation section), the contact of the probe onto the surface to be measured is detected. While the Z-axis control section is controlling the contact force to keep the vibration amplitude (or phase difference) constant, scanning and measurement are performed, and the profile of the surface to be measured is calculated from the low-frequency component obtained thereby.

Consequently, in this embodiment, two types of information can be obtained at the same time from the single displacement sensor: information about the vibration of the probe and information about the height of the surface to be measured at each measurement point. Because the single displacement sensor can replace two displacement sensors, which were required conventionally, the structure can be simplified, which used to be very difficult, and the price of the apparatus can be lowered, which was also very difficult before.

A method of controlling the contact force will be described next in detail. An example of vibrating the cantilever 14 at a constant frequency near the resonance frequency and detecting the contact force by a change in the amplitude of vibration will be described here.

The probe 12 on the cantilever 14 provided on the minute-vibration generation section 16 is brought closer to the surface 24 to be measured, while vibrating minutely up and down. When the probe 12 comes into contact with the surface 24 to be measured or is influenced by the interactive force acting between the atoms, the central frequency of the vibration changes, thus changing the amplitude of the vibration. Therefore, the contact force can be kept constant by detecting a change in the vibration state of the probe 12 and moving the cantilever 14 up and down with the Z-axis control section 17 to keep the change at a constant value.

Figure 2:
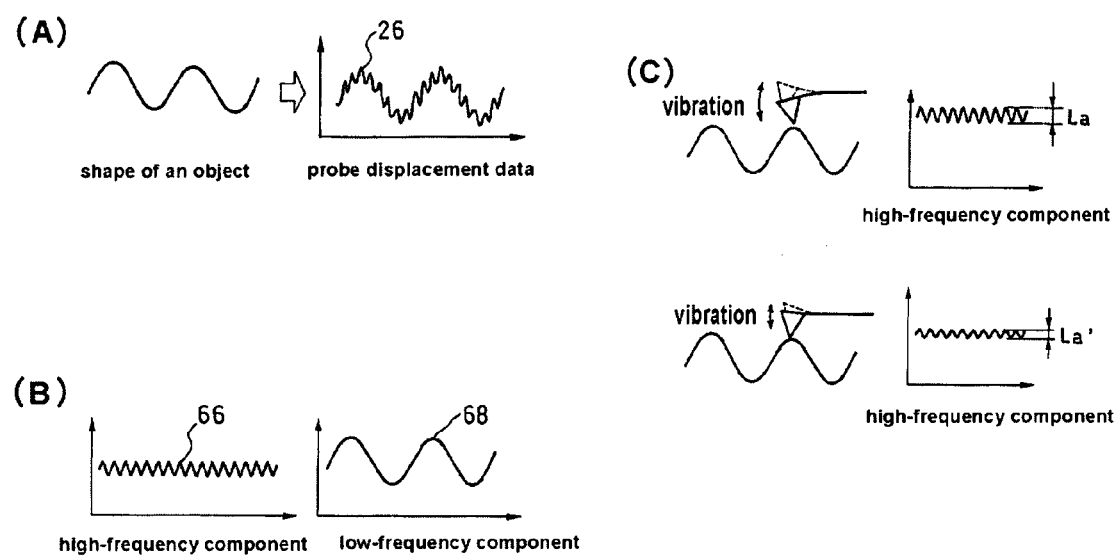
FIGS. 2A to 2C show a probe displacement signal obtained by the shape measuring apparatus shown in FIG. 1.

FIGS. 2A to 2C show the probe displacement signal 26, acquired by analyzing the interference signal 56 obtained by the shape measuring apparatus 10 of the embodiment. The figure shows an example of measuring sinusoidal profile.

The probe displacement signal 26 shown in FIG. 2A includes information indicating amounts of minute displacements caused by the vibration of the probe and information indicating the vertical movement of the probe along the uneven surface to be measured. In this embodiment, the probe is vibrated at a sufficiently high frequency in comparison with the displacement caused by the shape, and the probe displacement signal 26 is split into a high-frequency component 66 and a low-frequency component 68. FIG. 2B shows the high-frequency component 66 and the low-frequency component 68 split from the probe displacement signal 26.

The amplitude La of the high-frequency component 66 shown in FIG. 2C corresponds to the amount of displacement of the probe vibrated to detect the contact force. If the contact force increases, the amplitude of the high-frequency component 66 changes from La to La'. The Z-axis control section moves the cantilever up and down, so that the amount of bending of the cantilever, which would change the contact force, is kept constant, that is, the amplitude La of the high-frequency component 66 is kept constant. Therefore, the amount of displacement of the probe caused by the profile of the surface to be measured can be detected while the contact force is kept constant, by extracting the displacement data corresponding to the low-frequency component 68 when the amplitude La of the high-frequency component 66 is constant.

Figure 3:
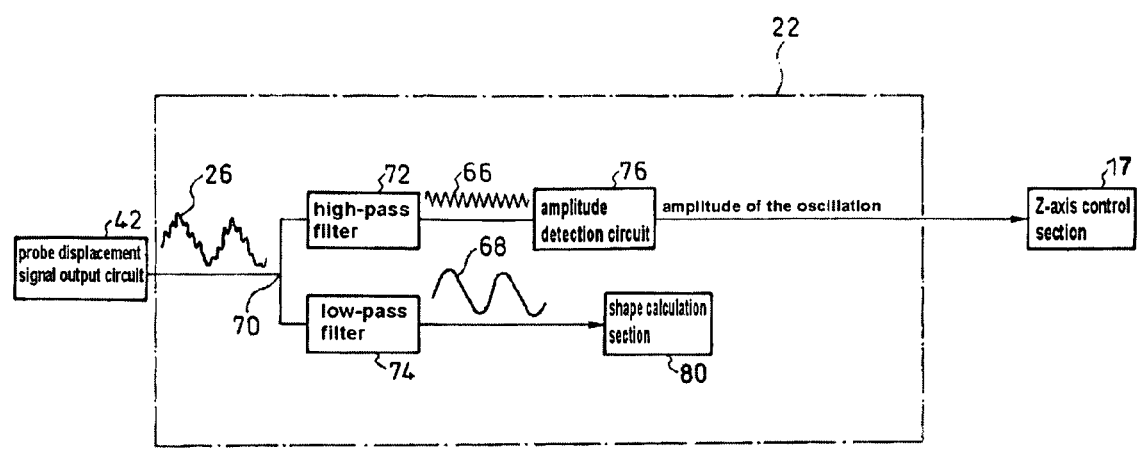
FIG. 3 is a section diagram showing the structure of a signal processing section shown in FIG. 1.

FIG. 3 is a section diagram showing a specific structure of the signal processing section 22, which characterizes the embodiment.

In the figure, the signal processing section 22 includes a signal-splitting section 70, a vibration-component extraction section 72, a profile-component extraction section 74, an amplitude detection circuit (vibration-information acquisition section) 76, and a shape calculation section (profile-information acquisition section) 80.

The signal-splitting section 70 splits the probe displacement signal 26 output from the probe displacement signal output circuit 42 into two parts.

The vibration-component extraction section 72 includes a high-pass filter (having a cutoff frequency set to about 1/5 to 1/10 of the vibration frequency of the probe) or a band-pass filter (having a central frequency of the pass band set close to the vibration frequency of the probe 12). The vibration-component extraction section 72 passes just the high-frequency component 66 of the probe displacement signal 26 sent from the signal-splitting section 70. Because the vibration of the probe has a higher frequency than the profile of the surface to be measured, the vibration-component extraction section 72 passes just the high-frequency component 66 of the probe displacement signal 26 to obtain the vibration information of the probe and eliminates the low-frequency component.

The profile-component extraction section 74 includes a low-pass filter (having a cutoff frequency set to 1/10 of the vibration frequency of the probe). The profile-component extraction section 74 passes just the low-frequency component 68 of the probe displacement signal 26 sent from the signal-splitting section 70. Because the profile information about the surface to be measured has a frequency lower than the vibration of the probe, the profile-component extraction section 74 passes just the low-frequency component 68 of the probe displacement signal 26 to obtain the profile information about the surface to be measured and eliminates the high-frequency component.

The amplitude detection circuit 76 detects the amplitude of the high-frequency component 66 obtained through the vibration-component extraction section 72. In this embodiment, the Z-axis control section 17 controls the vertical movement of the minute-vibration generation section 16 in accordance with the amplitude detected by the amplitude detection circuit 76, thereby keeping a constant contact force or a constant distance between the probe and the surface to be measured.

In the embodiment, the shape calculation section 80 calculates the profile of the surface to be measured, in accordance with the low-frequency component 68 obtained through the profile-component extraction section 74.

The shape measuring apparatus 10 of the embodiment can detect both the displacement and the contact force of the probe 12 with the single displacement sensor 20, so that the structure is simplified in comparison with the conventional apparatus using different displacement sensors to detect the contact force and displacement of the probe. As a result, the cost of the apparatus is expected to drop.

Modification

The present invention is not limited to the embodiment described above, and a variety of modifications can be made within the scope of the invention. For example, the contact-force detection method or the displacement sensor described below can be used.

Contact-Force Detection Method

In the embodiment described above, the cantilever is vibrated at a constant frequency near the resonance frequency, and the contact force is detected by a change in amplitude of the vibration. The contact-force detection method is not limited to the method described above, however, and may use the atomic force microscopy (AFM) method using an optical lever. More specifically, a method may be used in which the cantilever is vibrated at a constant frequency, and the phase difference between the signal for causing the vibration and the vibration of the cantilever is detected. Alternatively, a method may be used in which the cantilever generates self-excited vibrations, and the amount of shift from the resonance frequency is detected.

Displacement Sensor

Figure 4:
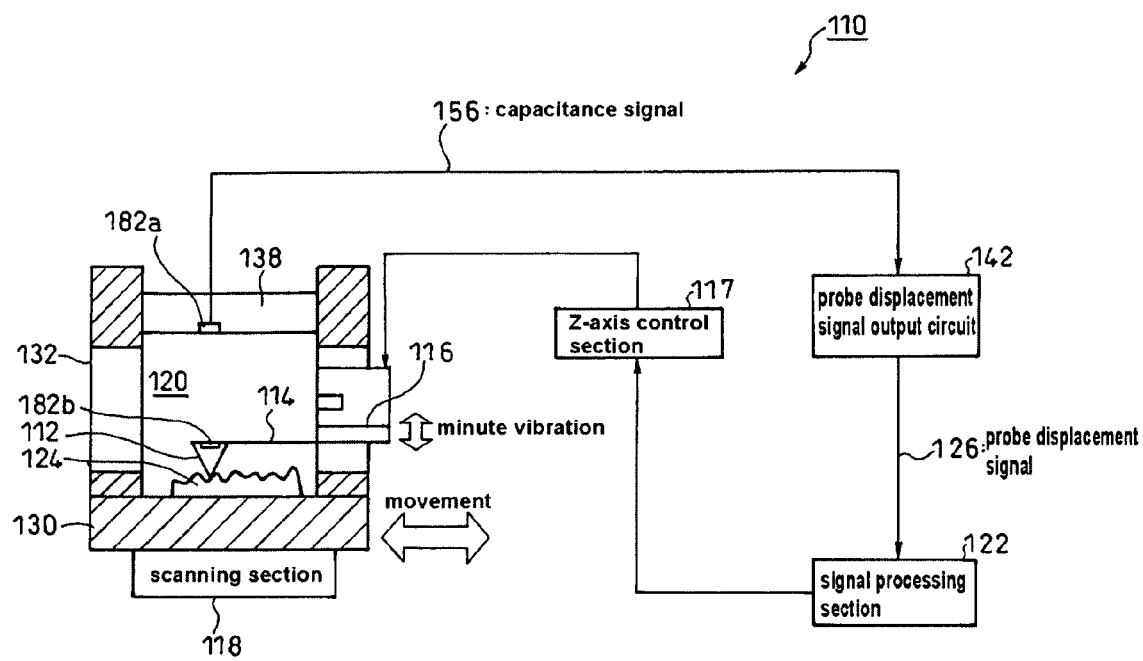
FIG. 4 is a modification of a displacement sensor shown in FIG. 1.
Figure 5:
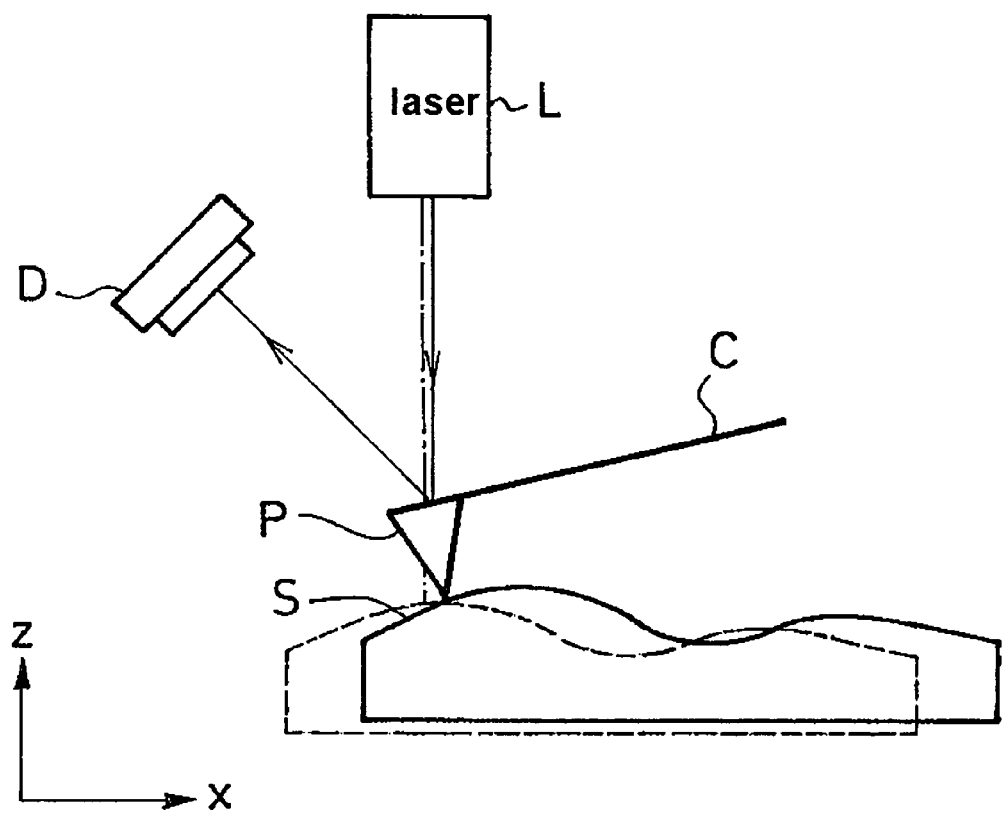
FIG. 5 illustrates the principle of an atomic force microscope, which is one example shape measuring apparatus.

The embodiment of the present invention described above uses a laser interferometric displacement sensor, but it is also preferred that a capacitance sensor be used, as shown in FIG. 4. In the figure, components corresponding to those shown in FIG. 1 are denoted by the same reference symbols plus 100, and a description thereof will be omitted.

In the figure, a capacitance displacement sensor 120 includes two flat electrodes 182a and 182b. One flat electrode 182a is disposed on a reference plane 138, and the other flat electrode 182b is disposed on a specific part of a probe 114. The capacitance displacement sensor 120 measures a change in capacitance between the flat electrodes 182a and 182b and outputs a capacitance signal 156. A probe displacement signal output circuit 142 outputs a probe displacement signal 126 in accordance with the capacitance signal 156.

In the shown structure, both the contact force and displacement of the probe 114 can be detected with the single capacitance displacement sensor 120. Therefore, the structure is simplified, and the cost of the apparatus is expected to drop.

What is claimed is:

1. A shape measuring apparatus comprising:
   a probe for scanning across a surface to be measured, while vibrating up and down;
   a minute-vibration generation section for vibrating the probe up and down;
   a vertical movement control section for moving the probe up and down to keep a constant contact force or a constant distance between the surface to be measured and the probe;
   a scanning section for scanning the surface to be measured with the probe;
   a displacement sensor for measuring vertical displacement of the probe and outputting a probe displacement signal; and
   a signal processing section for obtaining information about the contact force or distance between the surface to be measured and the probe from a high-frequency component, corresponding to the vibration of the probe, of the probe displacement signal output from the displacement sensor when the probe is brought closer to the surface to be measured while being vibrated, and for obtaining information about profile of the surface to be measured from a low-frequency component, corresponding to the profile of the surface to be measured, of the probe displacement signal output when the surface to be measured is scanned such that the distance or the contact force is kept constant.

2. A shape measuring apparatus according to claim 1, wherein the minute-vibration generation section vibrates the probe at a frequency higher than a sampling frequency for detecting the shape of the surface to be measured.

3. A shape measuring apparatus according to claim 1, wherein the signal processing section comprises:
   a signal-splitting section for splitting the probe displacement signal output from the displacement sensor;
   a vibration-component extraction section for extracting the high-frequency component corresponding to the vibration of the probe, from the probe displacement signal split by the signal-splitting section;
   a profile-component extraction section for extracting the low-frequency component corresponding to the profile of the surface to be measured, from the probe displacement signal split by the signal-splitting section;
   a vibration-information acquisition section for acquiring information about the vibration of the probe, from the high-frequency component obtained by the vibration-component extraction section; and
   a profile-information acquisition section for acquiring the information about the profile of the surface to be measured, from the low-frequency component obtained by the profile-component extraction section.

4. A shape measuring apparatus according to claim 3, wherein the vibration-component extraction section comprises a high-pass filter or a band-pass filter for passing just the high-frequency component, corresponding to the vibration of the probe, of the probe displacement signal; and
   the profile-component extraction section comprises a low-pass filter for passing just the low-frequency component, corresponding to profile of the surface to be measured, of the probe displacement signal.

5. A shape measuring apparatus according to claim 4, wherein the high-pass filter has a cutoff frequency set to about $1/5$ to $1/10$ of the frequency of the vibration of the probe;
   the band-pass filter has a central frequency of its pass band set close to the frequency of the vibration of the probe; and
   the low-pass filter has a cutoff frequency set to about $1/10$ of the frequency of the vibration of the probe.

6. A shape measuring apparatus according to claim 1, wherein the displacement sensor comprises a reference member held such that the position and orientation are unchanged with respect to the surface to be measured even during scanning; and
   the displacement sensor measures the vertical displacement of a specific part of the probe, with reference to the reference member.

7. A shape measuring apparatus according to claim 6, wherein the displacement sensor is a laser interferometric displacement sensor;
   the reference member comprises a reference mirror of the laser interferometric displacement sensor as a reference plane; and
   an interference signal is obtained by causing interference on the reference plane between reflection light from the reference plane, of light incident on the reference plane, and reflection light from the specific part of the probe, of light passing through the reference plane and incident on the specific part of the probe, and the interference signal is output as the probe displacement signal.

8. A shape measuring apparatus according to claim 6, wherein the displacement sensor is a capacitance displacement sensor; and
   opposed flat electrodes are disposed on the reference member and the specific part of the probe; and
   the probe displacement signal is based on a change in capacitance between the reference member and the specific part of the probe and is output.

9. A shape measuring apparatus according to claim 1, wherein the minute-vibration generation section vibrates the probe at a frequency higher than a sampling frequency for detecting the shape of the surface to be measured; and
   the signal processing section comprises:
      a signal-splitting section for splitting the probe displacement signal output from the displacement sensor;
      a vibration-component extraction section for extracting the high-frequency component corresponding to the vibration of the probe, from the probe displacement signal split by the signal-splitting section;
      a profile-component extraction section for extracting the low-frequency component corresponding to the profile of the surface to be measured, from the probe displacement signal split by the signal-splitting section;
      a vibration-information acquisition section for acquiring information about the vibration of the probe, from the high-frequency component obtained by the vibration-component extraction section; and
      a profile-information acquisition section for acquiring the information about the profile of the surface to be measured, from the low-frequency component obtained by the profile-component extraction section.

10. A shape measuring apparatus according to claim 9, wherein the vibration-component extraction section comprises a high-pass filter or a band-pass filter for passing just the high-frequency component, corresponding to the vibration of the probe, of the probe displacement signal; and
    the profile-component extraction section comprises a low-pass filter for passing just the low-frequency component, corresponding to profile of the surface to be measured, of the probe displacement signal.

11. A shape measuring apparatus according to claim 10, wherein the high-pass filter has a cutoff frequency set to about $1/5$ to $1/10$ of the frequency of the vibration of the probe;
    the band-pass filter has a central frequency of its pass band set close to the frequency of the vibration of the probe; and
    the low-pass filter has a cutoff frequency set to about $1/10$ of the frequency of the vibration of the probe.

12. A shape measuring apparatus according to claim 1, wherein the probe is disposed at a free end of a flexible cantilever, and the probe moves up and down in contact with the surface to be measured, in accordance with the profile of the surface to be measured.

13. A shape measuring apparatus according to claim 1, wherein the displacement sensor comprises a reference member held such that the position and orientation are unchanged with respect to the surface to be measured even during scanning;

the displacement sensor measures the vertical displacement of a specific part of the probe, with reference to the reference member; and the probe is disposed at a free end of a flexible cantilever, and the probe moves up and down in contact with the surface to be measured, in accordance with the profile of the surface to be measured.

14. A shape measuring apparatus according to claim 13, wherein the displacement sensor is a laser interferometric displacement sensor;

the reference member comprises a reference mirror of the laser interferometric displacement sensor as a reference plane; and an interference signal is obtained by causing interference on the reference plane between reflection light from the reference plane, of light incident on the reference plane, and reflection light from the specific part of the probe, of light passing through the reference plane and incident on the specific part of the probe, and the interference signal is output as the probe displacement signal.

15. A shape measuring apparatus according to claim 13, wherein the displacement sensor is a capacitance displacement sensor; and opposed flat electrodes are disposed on the reference member and the specific part of the probe; and the probe displacement signal is based on a change in capacitance between the reference member and the specific part of the probe and is output.

16. A shape measuring apparatus according to claim 9, wherein the displacement sensor comprises a reference member held such that the position and orientation are unchanged with respect to the surface to be measured even during scanning; and the displacement sensor measures the vertical displacement of a specific part of the probe, with reference to the reference member.

17. A shape measuring apparatus according to claim 16, wherein the displacement sensor is a laser interferometric displacement sensor;

the reference member comprises a reference mirror of the laser interferometric displacement sensor as a reference plane; and an interference signal is obtained by causing interference on the reference plane between reflection light from the reference plane, of light incident on the reference plane, and reflection light from the specific part of the probe, of light passing through the reference plane and incident on the specific part of the probe, and the interference signal is output as the probe displacement signal.

18. A shape measuring apparatus according to claim 16, wherein the displacement sensor is a capacitance displacement sensor; and opposed flat electrodes are disposed on the reference member and the specific part of the probe; and the probe displacement signal is based on a change in capacitance between the reference member and the specific part of the probe and is output.

* * * * *